April 28, 1964 E. L. SCHLAGE 3,130,489
METHOD OF FASTENING TOGETHER PIECES OF MATERIAL
Filed July 11, 1960 6 Sheets-Sheet 1
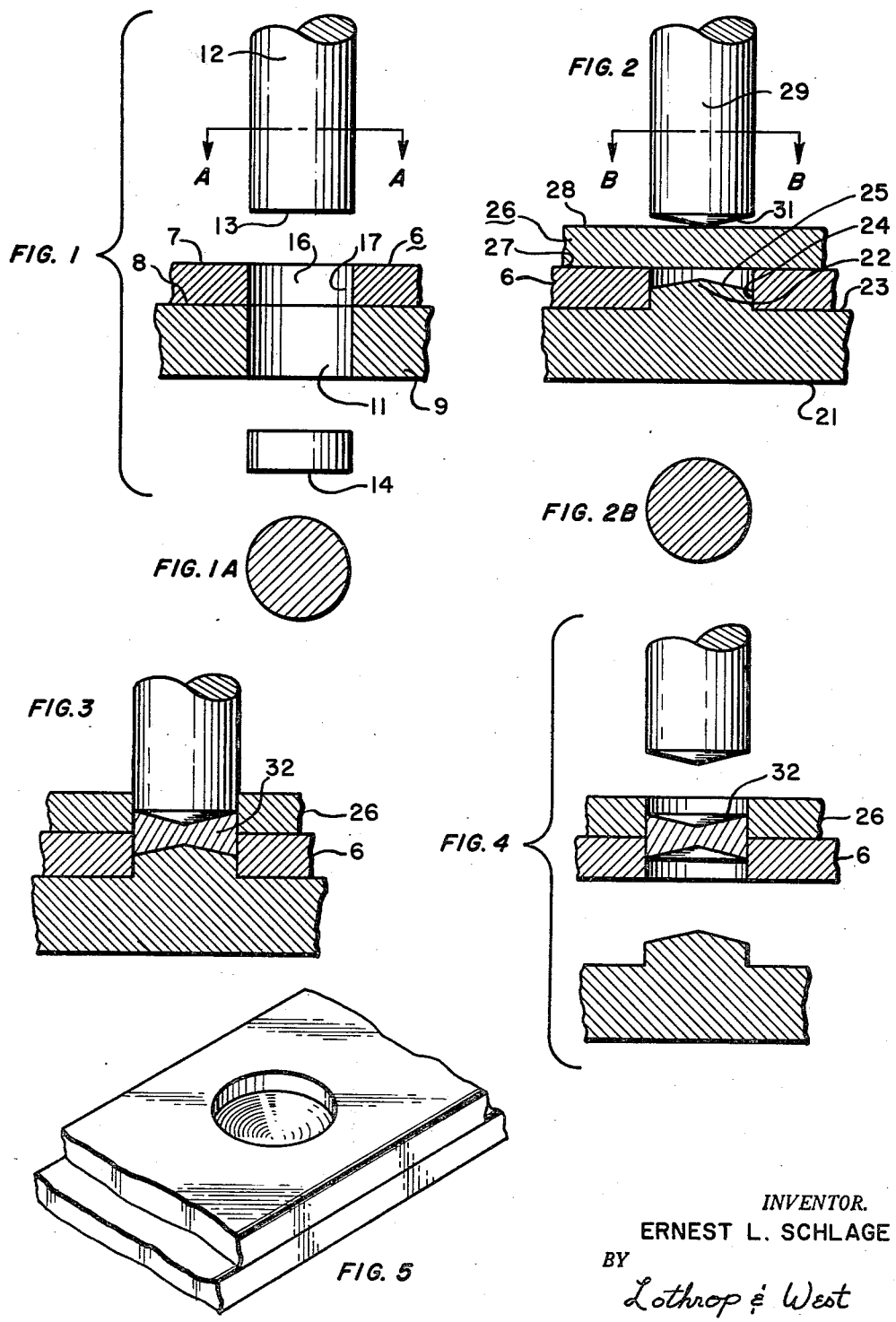
INVENTOR.
ERNEST L. SCHLAGE
BY
Lothrop & West
ATTORNEYS

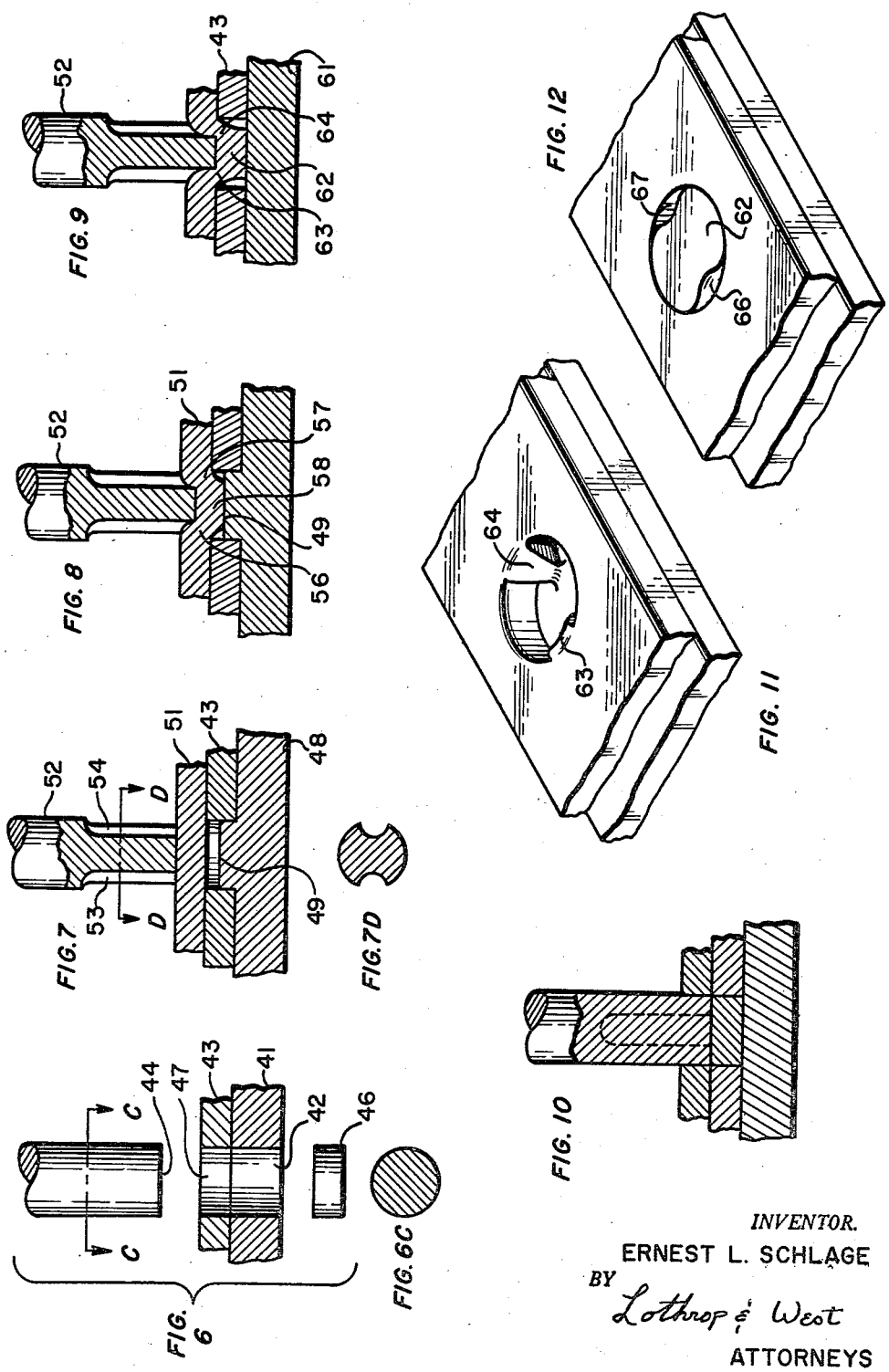

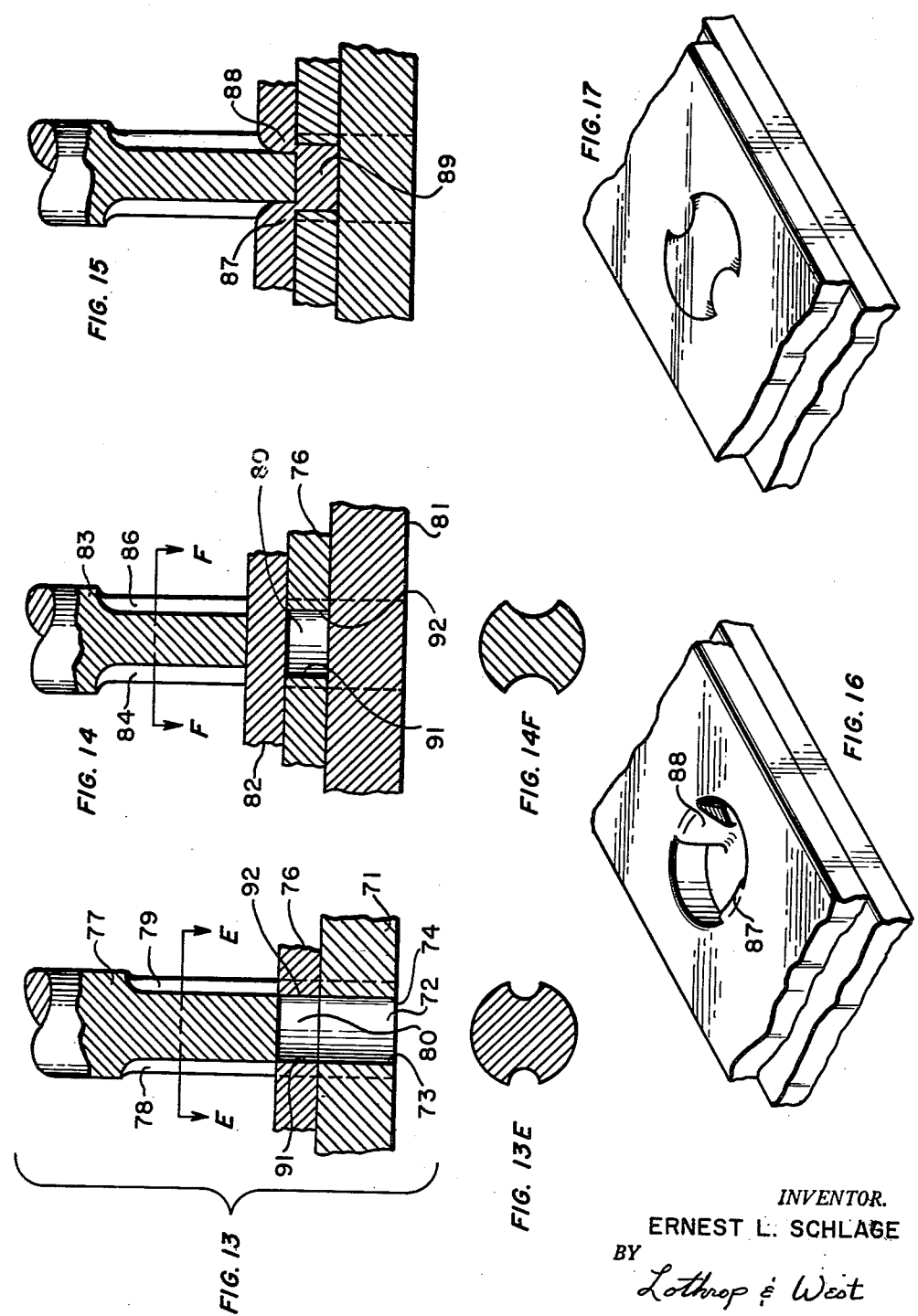

April 28, 1964  E. L. SCHLAGE  3,130,489
METHOD OF FASTENING TOGETHER PIECES OF MATERIAL
Filed July 11, 1960  6 Sheets-Sheet 4

INVENTOR.
ERNEST L. SCHLAGE
BY
Lothrop & West
ATTORNEYS

April 28, 1964   E. L. SCHLAGE   3,130,489
METHOD OF FASTENING TOGETHER PIECES OF MATERIAL
Filed July 11, 1960   6 Sheets-Sheet 5

*INVENTOR.*
ERNEST L. SCHLAGE
BY *Lothrop & West*
ATTORNEYS

United States Patent Office 3,130,489
Patented Apr. 28, 1964

3,130,489
METHOD OF FASTENING TOGETHER
PIECES OF MATERIAL
Ernest L. Schlage, Hillsborough, Calif., assignor to
Schlage Lock Company, a corporation
Filed July 11, 1960, Ser. No. 42,065
8 Claims. (Cl. 29—432)

While there are numerous ways of fastening together separate articles such as pieces of metal and comparable materials, they have various drawbacks. This makes an improved assembly and method of assembling advisable. As an example, when a part of a certain thickness is to be stamped from metal, it is often the practice to form two substantially identical pieces, each of only half the desired thickness. Two separate thin pieces are then stacked and fastened together to form a unit of the desired thickness. The fastening operation usually has various detrimental features. Even so, to produce a composite article is better than to form a single thick piece. Spot welding the thin pieces together may make too firm an attachment, since it may be desired again to separate the parts after only a temporary junction. Also, spot welding involves local high temperatures adversely affecting the material and often leaves a splatter or extra weld material. These factors usually are detrimental and interfere with subsequent operations.

The separate, thin pieces of material after prepunching or predrilling can be secured by the insertion and finishing of rivets or by the provision and bending of tabs. These practices also have drawbacks because the thickness of the resulting part is increased in some areas and rather careful registration of the thin pieces is required, and for other reasons. These examples indicate that there remains a problem of fastening pieces of material together.

Objects

It is therefore an object of the invention to provide a method of assembling two pieces of material without the use of external heat and without the use of extraneous parts such as rivets.

Another object of the invention is to assemble two or more pieces without increasing or substantially changing the thickness of the combined pieces.

A still further object of the invention is to assemble two pieces as firmly as desired.

Another object of the invention is in general to provide an improved method of assembling materials.

Other objects, together with the foregoing, are attained in the embodiments of the invention and the methods of practicing the invention described in the accompanying description and illustrated in the accompanying drawings.

The Drawings

FIGURE 1 is a diagrammatic view, partly in side elevation, but largely in cross section, showing an initial step in performing a first assembling method according to the invention.

FIGURE 1A is a cross section, the plane of which is indicated by the line A—A of FIGURE 1.

FIGURE 2 is a diagrammatic view somewhat similar to FIGURE 1, but showing a succeeding step in the first method.

FIGURE 2B is a cross section, the plane of which is indicated by the line B—B of FIGURE 2.

FIGURE 3 is a view similar to FIGURES 1 and 2, but illustrating a further step in the first method.

FIGURE 4 is a view similar to FIGURES 1, 2 and 3, and illustrating the conclusion of the first method and the appearance of the first form of assembly in cross section.

FIGURE 5 is an isometric view showing the obverse of a first form of assembly which has been made by the first assembling method of the invention.

FIGURE 6 is a view, similar to FIGURE 1, showing the first step in a second assembling method pursuant to the invention.

FIGURE 6C is a cross section, the plane of which is indicated by the line C—C of FIGURE 6.

FIGURE 7 is a view similar to FIGURE 6, but showing a successive step in the second assembling method.

FIGURE 7D is a cross section, the plane of which is indicated by the line D—D of FIGURE 7.

FIGURE 8 is a view similar to FIGURE 7 showing an intermediate step in the second assembling method of the invention.

FIGURE 9 is a view similar to FIGURE 8, but showing a step in a third assembling method pursuant to the invention.

FIGURE 10 is a cross sectional view of the showing of FIGURE 9, the plane of section being at right angles to the sectional plane of FIGURE 9.

FIGURE 11 is an isometric view of a form of assembly resulting from the method illustrated by FIGURES 9 and 10, the view being of the upper side.

FIGURE 12 is a view similar to FIGURE 11, the showing being of the nether side.

FIGURE 13 is a view in cross section showing the first step in a fourth assembling method pursuant to the invention.

FIGURE 13E is a cross section, the plane of which is indicated by the line E—E of FIGURE 13.

FIGURE 14 is a view similar to FIGURE 13, but showing a subsequent step in the fourth assembling method of the invention.

FIGURE 14F is a cross section, the plane of which is indicated by the line F—F of FIGURE 14.

FIGURE 15 is a cross sectional showing of the final step in the fourth assembling method according to FIGURES 13 and 14.

FIGURE 16 is an isometric view of the upper portion of a fourth form of assembly made in accordance with the fourth method.

FIGURE 17 is a view similar to FIGURE 16, and showing the fourth form of assembly from the lower side.

Figure 18:
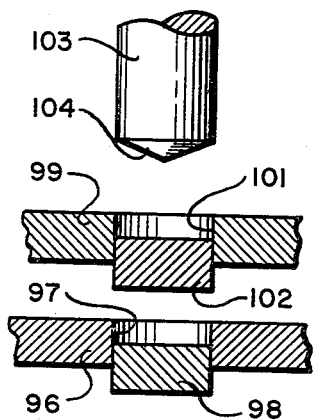
FIGURE 18A is a view similar to FIGURE 1 showing an initial step in performing a fifth assembling method according to the invention.
Figure 19:
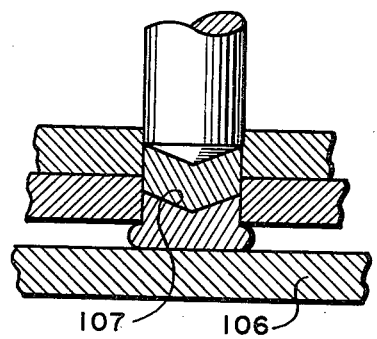

FIGURE 19B supplements FIGURE 18A and shows a successive step in the fifth assembling method.

Figure 20:
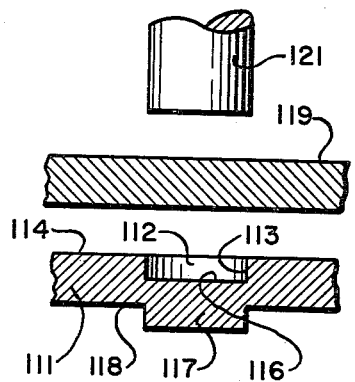

FIGURE 20A shows an initial step in a sixth assembling method.

Figure 21:
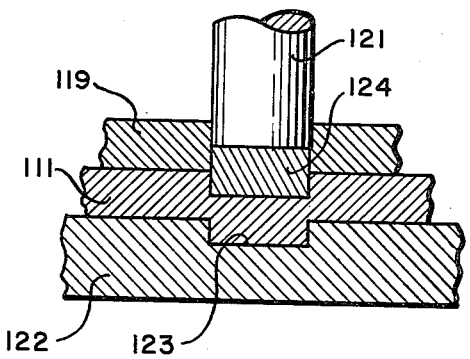

FIGURE 21B illustrates a subsequent step in the sixth assembling method.

Figure 22:
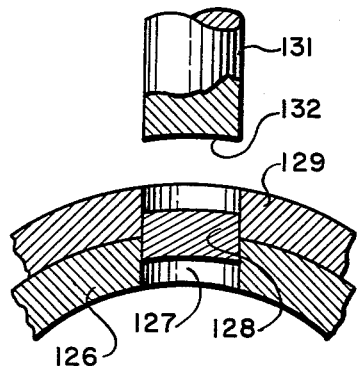

FIGURE 22 schematically represents a seventh form of assembly and a step in a seventh assembling method.

Figure 23:
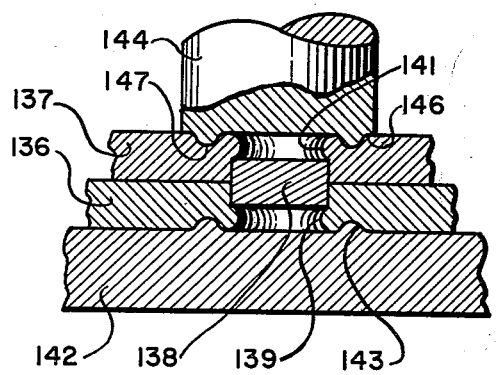

FIGURE 23 shows the parts of an eighth form of assembly and illustrates a step in the related method.

Figure 24:
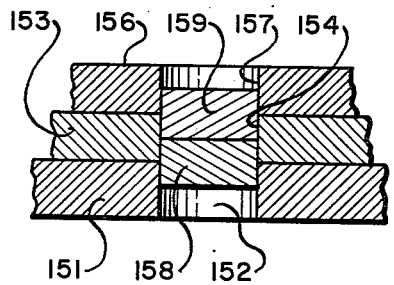

FIGURE 24 shows in cross section a ninth form of assembly.

Figure 25:
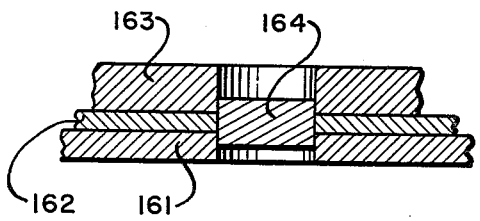

FIGURE 25 is a similar view of a tenth form of assembly.

Figure 26:
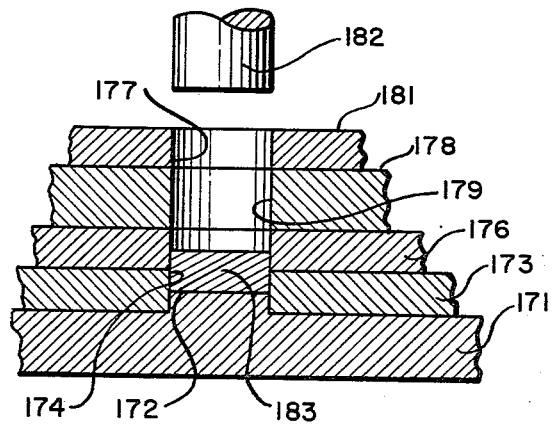

FIGURE 26 illustrates a step in an eleventh assembling method and the resulting eleventh form of assembly.

Figure 27:
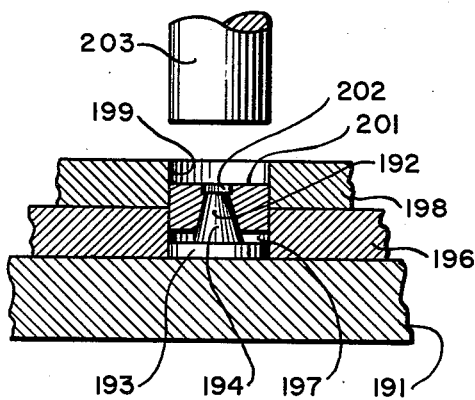

FIGURE 27 shows in cross section and in elevation the parts involved in a twelfth assembling method and indicates a step in that method.

Figure 28:
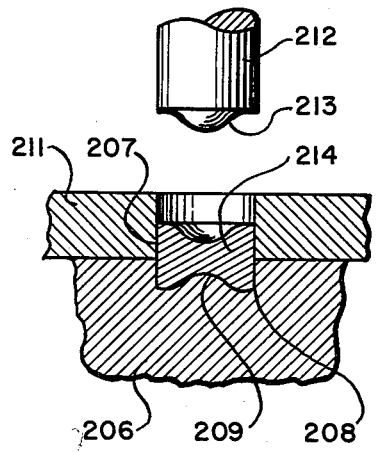

FIGURE 28 is a view comparable to FIGURE 27 but shows a thirteenth form of assembly and indicates a related method step.

Figure 29:
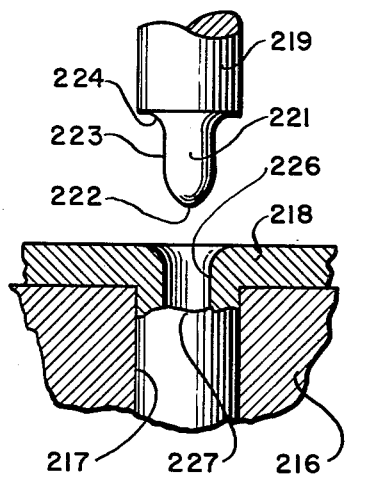

FIGURE 29 illustrates a step in a fourteenth assembling method and the resulting assembly.

Figure 30:
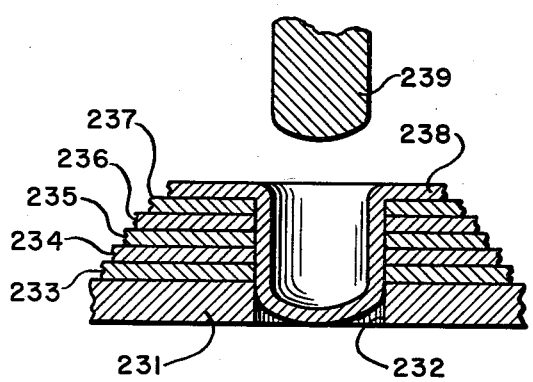

FIGURE 30 is a cross section showing a fifteenth form of assembly and a step in the method of making that assembly.

*Description*

While the method of assembling materials according to the invention can be practiced in a large number of different ways, it is here described in only a few of the many modifications possible.

The assembly, as well, can appear in numerous different forms, a few exemplary ones of which are described herein.

*First Form*

Considering first the form of assembly and method of assembling illustrated in FIGURES 1 to 5, inclusive, the invention is carried out in connection with a first piece 6. This preferably, although not necessarily, is a sheet or strip or layer of metal or of other material which is amenable to the method. A strip of steel such as is normally used in stamping operations is an example. The piece 6 usually but not necessarily is substantially uniform in thickness, being bounded by a substantially plane, upper face 7 and a similar, parallel, plane, lower face 8.

As a first step in the first assembling method, the first piece 6 is positioned on a die block 9 having therein an opening 11 of a predetermined size and shape or transverse cross section. Disposed to cooperate with the die block 9 is a punch 12 usually, although not necessarily, of about the same shape as the opening 11; for example, of circular cross section as shown in FIGURE 1A. The punching has a punching face 13. After the first piece 6 has been initially positioned on the die block 9, the punch 12 is lowered into the opening 11. There is thus sheared and displaced from the first piece 6 a disc 14 virtually of the thickness of the first piece 6 and about of the contour shared by the opening 11 and the punch 12. There then extends through the first piece 6 an aperture 16 which has approximately cylindrical walls 17 approximately normal to the planes of the faces 7 and 8.

The next stage of the first method is accomplished by shifting the first piece 6 after perforation onto a successive die block 21. The block not only is imperforate, but preferably has an anvil 22 upstanding from the otherwise planar upper face 23. The anvil 22 is substantially of the same diameter as the aperture 16, has a generally cylindrical upstanding side wall 24, and is of a height approximately equal to half the height or thickness of the piece 6. Preferably, the anvil has a conical upper bounding surface 25 centered in the aperture 16.

Over the piece 6, so positioned, there is provided a second piece 26 conveniently of material, such as metal, like that of the piece 6, although not necessarily so. Ordinarily, the thickness of the piece 26 is about the same as that of the piece 6, although this also is subject to wide variation. The piece 26 is preferably bounded on the bottom 27 by a plane and on the top 28 by a parallel plane, so that when the piece 26 is superposed upon the piece 6 in a position overlying the aperture 16, the various planar bounding surfaces of the pieces are substantially parallel.

When the pieces have been positioned as shown in FIGURE 2, a punch 29 is brought into play. The punch has a cross sectional contour substantially the same as that of the aperture 16 and has an end surface 31 which is flatly conical, about like the reverse or image of the cone 25. The punch 29 is made to descend. The effect is to place the second piece 26 in shear with the shear surface substantially congruent with the cylindrical surface 17. The result is the shearing and displacement or dislodgment of a slug 32 (FIGURE 3) of material from the second piece 26 and the disposition of the slug between the conical surfaces 25 and 31 and about half way within the second piece 26 and half way within the first piece 6.

The punch 29 and the anvil 22 are preferably, although not necessarily, made to approach each other even closer after the shearing and repositioning of the slug so that the material of the slug is displaced or enlarged peripherally. This additional relative approaching movement of the pressure members forms the upper and lower faces of the slug 32 into somewhat conical shape and causes a peripheral expansion. The slug deformation is accompanied by a resulting displacement of the surrounding material of the upper and lower, or second and first, pieces. The distorted slug affords a sort of interlock. It is possible that the lower piece 6 can be laminated instead of singular, in which case the slug is disposed to engage all or, at least, the lowermost of the laminations.

During the descent of the punch 29 and the shearing movement of the upper piece 26 to result in the slug 32, the work imposed by the punch upon the pieces and the slug is manifested as heat. Since the slug is sheared and displaced in one movement, there is heat transfer between the slug and both the second and the first pieces. The interengagement of the slug with both the upper and lower pieces is thus improved.

The movement of the slug from the upper piece is part of the shearing step. The shearing is not along a precise geometrical line, but is accompanied by some irregular displacement and localized flow of the parting material. There result some longitudinal or axial striations along the remaining wall of the second piece 26. These striations are substantially complementary to or interfit with somewhat similar axial striations along the outer periphery of the slug 32. The slug 32, upon entering into the aperture 16, the margin of which acts as a shearing die or die block, firmly interlocks with the wall surface of the aperture in the first piece. The slug, acting as a punch, effectuates the continuation of similar axial striations partly into the first piece 6. This forms a good interlock especially against relative twisting of the pieces and the slug.

In addition to the work in shearing and displacing the slug 32, the work upon the positioned slug to make it somewhat thinner centrally and to expand it circumferentially also appears as heat which helps to produce an intimate interconnection between all the contacting parts.

Following the squeezing step as illustrated in FIGURE 3, the punch 29 is withdrawn and the anvil 22 and die block 21 are likewise relatively moved away from the pieces 6 and 26 and the slug 32. This results in a finished assembly substantially as shown in the central portion of FIGURE 4 and as illustrated in FIGURE 5. The two initially separate pieces have therefore been assembled by a method which does not involve the use of a separate member such as a rivet, does not involve any spot welding, but does afford a full interengagement or junction between the parts. If desired, the relative size of the slug 32, particularly with respect to the aperture 16 and the amount of displacement of the slug 32 after it has been sheared and positioned, can be varied so that the interconnection of the pieces 6 and 26 may be only sufficient for normal handling. Then, by the insertion of a separating tool between the pieces and the exertion of a small separating force, the pieces can be released from each other. The slug 32 can either be left in position in one piece or can be knocked out completely. In most cases, however, the slug 32 is so proportioned and treated as to afford a permanent interconnection between the pieces.

Second Form

If desired, there can be provided an operation quite similar in the first step to that already described. That is, on a die block 41 (FIGURE 6) having a suitable aperture 42 therethrough, there is positioned a first piece 43 of material of the sort described. A punch 44 descends on the piece 43 on the die block 41 and dislodges a disc 46. The resulting aperture 47 in the piece 43 is substantially as previously described. The apertured piece 43 is then moved to a die block 48 having an anvil 49 projecting upwardly therefrom to a height substantially equal to half the thickness of the first piece 43 and conforming in plan substantially to the shape of the aperture 47. The anvil 49 is not illustrated as conical on top, although it may be.

Superposed on the piece 43 is a second piece 51 also substantially of the characteristics heretofore described. Above the piece 51 is a punch 52 having the customary circular shape except for a pair of opposite, arcuate grooves 53 and 54 near the bottom. The location, shape and number of grooves are at the choice of the user, but the cross section of the punch and of the aperture 47 are different.

The punch 52 descends and simultaneously shears some part and displaces another part of the material of the second piece 51. That is to say, the punch 52, in descending, shears those portions, arcuate in plan, of the second piece 51 which substantially register with or are congruent to the subjacent wall of the prepunched aperture 47. As to those portions of the second piece 51 which are near the grooves 53 and 54, and so are not congruent with the subjacent wall of the aperture, there is no shearing but rather an elongation or stretching of the unsheared material of the piece 51. In the case of two grooves 53 and 54, the operation provides a pair of connectors 56 and 57 which remain joined to the main body or piece 51, but also remain joined to the slug 58. The slug is partially but not entirely detached from or sheared from the second piece 51, being connected theerto in the zones of the connectors 56 and 57. The slug is bodily displaced in an axial direction, about as before, except that the connectors are deflected and stretched.

The punch 52 may approach the anvil 49 so closely that the partially severed slug is squeezed and peripherally expanded and is made thinner, so as to increase the closeness of lateral interconnection between the slug and the first piece 43, and between the displaced portions of the slug and the adjacent portions of the sheared wall of the second piece 51.

Third Form

As a variation, a die block 61 may be provided without any anvil 49 (FIGURES 9 and 10). In this case, the punch 52 is made to descend farther, far enough to cut and displace the partially sheared slug 62 and to deflect and stretch connectors 63 and 64. The slug is then finally located and laterally expanded not in a position only partially entered into the piece 43, but in a position fully entered within the lower or first piece 43. This results in a structure which in one cross sectional plane appears as shown in FIGURE 9 and in another cross sectional plane at right angles to the first plane appears as shown in FIGURE 10. The showing in FIGURE 11 illustrates the appearance of this assembly from above, while FIGURE 12 shows the appearance of the assembly from below, there being slight gaps 66 and 67 at either side of the fully displaced slug 62 in the regions where the connectors 63 and 64 are disposed.

Fourth Form

As an alternative, there is provided a die block 71 (FIGURE 13) having an aperture 72 therethrough of a predetermined cross sectional shape. This aperture is approximately circular cylindrical for the most part, but has a pair of re-entrant cylindrical ribs 73 and 74. Positioned on the die block over the aperture 72 is a first piece 76, substantially of the sort previously described. Descending upon the piece 76 is a punch 77 provided with grooves 78 and 79 and of a contour approximately to complement the contour of the aperture 72. The punch severs from the first piece 76 a disc having substantially the shape of the cross section of the punch 77 to leave a complementary perforation 80.

The piece 76 having the perforation 80 is positioned as shown in FIGURE 14 on a planar die block 81. Superimposed upon the first piece 76 is a second piece 82 of material of the indicated sort. Adapted to descend onto the piece 82 is a punch 83 having substantially the same circular cross sectional diameter as the punch 77 but the punch 83 also has a pair of grooves 84 and 86. The grooves 84 and 86 have the same relative positions as the grooves 78 and 79, but are considerably greater in extent.

When the punch 83 descends through the second piece 82, it shears portions of the piece 82 while leaving intervening portions thereof intact to provide connectors 87 and 88 as shown in FIGURE 15. The sheared portions in part define a slug 89 displaced into the perforation 80, but since there are re-entrant portions 91 and 92 in the piece 76, the exterior portions of the connectors 87 and 88 conform quite closely thereto. The portions 91 and 92 are initially made of the proper size and in the proper positions to result in a final configuration substantially as shown in FIGURE 17. The result is that there are substantially no voids remaining and there is effected a keying to resist relative twisting or rotation of the pieces. The surface of the assembly on one side, at least, is substantially planar and smooth also as shown in FIGURE 17, while the surface of the assembly on the other side, as shown in FIGURE 16, is characterized by the appearance of the connectors 87 and 88.

Fifth Form

As particularly shown in FIGURES 18A and 19B, the assembly according to the invention may be provided and the related method of assembling may be carried out in connection with a first piece 96 comparable to the similar pieces heretofore described. The piece 96 has a recess 97 in the upper portion thereof resulting from the displacement of a slug 98 part way out of the piece. To cooperate with the first piece 96 a similar second piece 99 is disposed thereover. The second piece can be identical with the first piece and at least has a comparable recess 101 left by a protruding slug 102. Preferably the first and second pieces are placed as nearly as may be in registry with the protruding portion of the slug 102 close to or received within the recess 97 and with the recess 101 in line with a punch 103 having a point 104 of any suitable shape, for example, conical.

The pieces 96 and 99, being superposed and lined up with the punch 103, are supported on a die block 106 (FIGURE 19B) so that the descending punch 103 enters into the recess 101. The slug 102 is thus forced into the recess 97 of the subposed piece, and also is deformed and laterally expanded, thus bringing it into firmer and tighter engagement with the piece 96. Additionally, distortion of the slug 102 is accompanied by distortion of the subposed slug 98. The slug 98 expands somewhat beneath the first piece 96 and interlocks therewith as well as expanding laterally into firm engagement with the first piece 96. The resulting interface 107 between the slugs 102 and 98 is approximately the shape of the depression in the slug 102 left by the contoured punch 103. There results an assembly of pieces fastened together by distortion of the two slug portions of initially identical or quite similar pieces.

Sixth Form

It is not always necessary that the initially prepared piece have an aperture extending entirely therethrough. In some instances, there can be merely a recess. For example, the first piece 111 (FIGURE 20A) can be formed with a recess 112 defined by an approximately circular cylindrical wall 113 substantially normal to the usual, planar upper surface 114 of the first piece. The bottom of the recess 112 is conveniently demarked by a planar surface 116 parallel to the surface 114, although these geometrical relationships need not be exactly observed. If the recess 112 has been formed by downward displacement of material from the first piece 111, there may result a depending boss 117 as a counterpart of the recess 112. It is possible also to produce a recess 112 by displacement of the material laterally into the surrounding portions of the first piece 111. This does not provide any projecting boss 117 and leaves the entire undersurface 118 of the first piece 111 substantially planar and parallel to the upper surface 114. In some fashion there is provided in the first piece 111 a suitably shaped and located recess 112.

Pursuant to the invention, there is superposed over the first piece 111 a second piece 119, both pieces being disposed so that the recess 112 aligns with a punch 121 above the second piece 119. The pieces so disposed are backed up by a die block 122 (FIGURE 21B) having a depression 123 therein to receive the projecting boss 117 or, in the event there is no projecting boss, the die block 122 is planar. In either case the first piece is uniformly supported throughout. The punch 121 is then made to descend and to displace a slug 124 from the second piece 119. The slug 124 enters into and occupies the recess 112 and expands. The recess is susbstantially filled by the slug 124 which is then in firm, tight engagement with the surrounding walls of both the first piece 111 and the second piece 119. The first and second pieces are removed from the die block 122 after the punch 121 has been retracted from the position shown in FIGURE 21B. There results an effective assembly.

Seventh Form

It is not essential in all cases that the pieces be planar, although reference has been made to planar members for clarity of disclosure and understanding herein. The invention can be embodied with structures which are not planar, but, for example, are arcuate, or even spherical. The arcuate arrangement illustrated in FIGURE 22 is intended primarily to represent adaptation of the invention to curved or arcuate cylindrical members. The first piece 126 is a curved cylindrical member and is provided with an aperture 127 extending therethrough or, alternatively, has a sufficient recess, such as is shown in FIGURE 20A, to receive a slug 128 displaced into the first piece 126 by partial removal from a curved second piece 129.

Both the pieces 126 and 129 are shown as having substantially concentric curvatures in the vicinity of the slug 128, although this is not essential. The piece 129, for example, can be approximately planar or reversely curved although substantially tangent to the first piece 126 in the vicinity of the slug 128. While a flat-ended punch can be used, it is preferred in connection with this embodiment to utilize a punch 131 having a concave lower surface 132. The curvature of the surface 132 matches approximately the curvature of the slug 128 in final position. Moreover, the curvature of the surface 132 can be two-dimensional or cylindrical or can be three-dimensional or spherical. That is, the surface 132 can be a portion of a spherical or comparable surface. In any event, the slug 128 is derived and positioned substantially as heretofore described and is effective to hold together the first piece 126 and the second piece 129 in an assembly.

Eighth Form

In most instances the positioning of the slug by a punch is effective not only to locate the slug in juxtaposition with the first and second pieces but also by utilization of appropriate pressure and backing is also effective to expand the slug circumferentially into as firm engagement with the surrounding first and second pieces as desired. However, it is also possible to position the slug and to produce a firm engagement of the slug with the surrounding material not so much by expansion of the slug itself, but rather by contracting or withdrawing the material of the surrounding pieces into the desired firm engagement with the then constricted slug.

This form of the invention can be practiced with a structure similar to that shown in FIGURE 4, for example, either with the conical indentations in the slug or, preferably, without them. As illustrated in FIGURE 23, a first piece 136 and a superposed second piece 137 are related to a slug 138 in relatively loose engagement with the recess wall 139 of the first piece 136 and the wall 141 of the second piece 137. This is disposed on a die block 142 provided with an upstanding annular projection 143 conveniently having a sinusoidal cross section. Related to the die block 142 is a punch 144 having a lower face 146 from which depends an annular projection 147 also conveniently of sinusoidal cross section and disposed in approximate registry with the projection 143.

After the first piece 136 and the second piece 137, with the slug 138 therein, have been positioned on the die block 142, the punch 144 descends. This has the effect of driving the first piece 136 into full engagement with the die block 142 so that the projection 143 produces an annular indentation in the first piece 136. Some of the material of that piece is thereby displaced in a constricting fashion around the lower portion of the slug 138. Some of the material of the first piece 136 intrudes beneath the slug 138. Comparably, the punch 144, in coming into engagement with the second piece 137, is effective by means of the projection 147 to produce an indentation in the upper surface thereof and to displace material of the second piece so that it deflects the recess wall 141 to intrude into the space above the slug 138. Perhaps more important, the surrounding material of the second piece 137 is constricted against and compresses the material of the slug 138. There is thus afforded an extremely well interrelated assembly.

Ninth Form

As indicated above, more than two pieces can be connected by a slug. It is possible to utilize, as shown in FIGURE 24, a first piece 151 having a recess or an opening 152 therein, as before. On the first piece is positioned a second piece 153 having a wall 154 defining a central opening, and on this is superposed a third piece 156 having a similar wall 157 defining either a recess or an opening. By a technique as previously disclosed, a slug 158 is engaged with the second piece 153 and also is lodged partially within the opening 152 in the first piece 151. A second slug 159 in part is engaged with the third piece 156 and also is partly in engagement with the second piece 153, preferably in firm abutment with the first slug 158. Both the slugs 158 and 159 are located to span the interfaces between the adjacent superposed pieces, and are circumferentially expanded into firm and tight interengagement with their surrounding members.

Tenth Form

A single slug can readily be in close interengagement with a plurality of superposed pieces to form an assembly. A first piece 161, as shown in FIGURE 25, is overlaid with a second piece 162, of a somewhat comparable thickness, for example, although the thickness is not critical, and also is overlaid by a third piece 163 illustrated as of different thickness. In any of the manners heretofore disclosed, a slug 164 is displaced from coplanar relationship with the third piece 163 sufficiently so that the lower portion of the slug 164 is in interengagement with the first piece 161 while the slug is still in engagement with the third piece 163. In this fashion, the slug 164 bridges the second piece 162. Under most circumstances, the slug is in firm interengagement with the second piece, but if desired, the second piece 162 can be prepared with an opening of substantially greater diameter than that of the slug 164. The second piece 162 is then confined in a direction along the axis of the slug 164, but is out of contact with the circumference of the slug. Thus either a firm or a loose circumferential interengagement can be had between the slug and the second piece in this form of assembly.

*Eleventh Form*

While ordinarily the slug which is displaced is entirely or partially cut from or displaced from the material of the upper piece, it is possible to carry out the method by utilizing an extraneous slug, and without interrupting the forming and positioning operations. In this embodiment there is provided a die block 171 (FIGURE 26) having an anvil 172 projecting therefrom in the fashion described in connection with FIGURE 2, for example. On the die block 171 is positioned a first piece 173 having an opening 174 or recess adjacent the anvil 172. A second piece 176 is disposed over the first piece 173 and also has an opening 177 in registry with the anvil 172. A die plate 178 is positioned over the second piece 176 and conveniently is of a hard material with an opening 179 therethrough. The die plate 178 with the opening is made in the customary fashion for dies. Superposed on the die plate 178 is a source piece 181 of any convenient material. For example, the piece 181 may be a sheet of material such as silver. A punch 182 is disposed in appropriate relationship not only with the die plate 178 but also with the die block 171 and the anvil 172, being substantially in alignment therewith.

The punch 182 is operated to descend toward the die block 171 and is effective with the cooperation of the die plate 178 to cut a slug 183 from the source piece 181 and to displace the slug entirely through the die plate 178 and partially through the second piece 176 and into partial engagement with the first piece 173. The punch 182 can approach the anvil 172 closely enough so that the slug 183, particularly if it is of quite ductile material, can be expanded into firm interengagement with the first piece 173 and the second piece 176. Following this, the source piece 181 and the die plate 178 are removed and the assembly is removed from the die block 171 for use.

*Twelfth Form*

The slug is not necessarily an imperforate member, but in certain instances can be perforated or can be annular in form. Advantage is taken of this particular shape to carry out the purposes of the invention for tight interengagement between the slug and its surroundings. In this instance the die block 191 (FIGURE 27) is substantially planar, except that it is provided with an upstanding compound projection, generally designated 192. The projection conveniently includes a lower disc 193, conveniently having a circular cylindrical boundary. Superposed on the disc is a truncated conical portion 194, at its base of somewhat less diameter than the disc 193 and at its truncated apex considerably less in diameter than at its base, so that the conical surface decreases or tapers upwardly.

Around the projection 192 and on the die block 191 is disposed a first piece 196 having an opening 197 therein encompassing the disc 193. Superposed on the first piece 196 is a second piece 198 having an opening 199 of appropriate configuration therein. Positioned in the opening 199 is a slug 201 of generally annular form, having an initially cylindrical opening 202 therethrough. The slug 201 is arranged so that its central opening 202 overlies the conical portion 194 of the die block projection. A punch 203 descends upon the subposed pieces and drives the slug 201 onto the conical projection portion 194 so that the initially annular slug is not only displaced part way through the second piece 198 and part way into the first piece 196, but is likewise radially expanded into firm interengagement with the pieces 196 and 198. The punch 203 is withdrawn and the pieces 196 and 198, with their lodged and conically expanded slug, are removed from the die block 191 for use as an assembly.

*Thirteen Form*

The assembly of members of various shapes can readily be accomplished according to the invention, and it is not necessary that the pieces be strips or small or entirely perforate. The first piece 206, as illustrated in FIGURE 28, is a massive body of indeterminate extent. There is provided in it a recess 207 defined by an approximately cylindrical side wall and by a bottom wall 208, conveniently contoured to have an upwardly bulging central protuberance 209. Joined to the first piece 206 is a second piece 211 which can also be of indeterminate contour, but for convenience is illustrated as a strip. A plunger 212 is in registry with the recess 207 and is provided not only with the customary side wall, but also with a downwardly extending projection 213, conveniently a mirror image of the protuberance 209, although not necessarily so. The punch 212 drives into the second piece 211, displacing a slug 214 therefrom and simultaneously contouring and expanding the slug not only into the first piece 206, but also into the second piece 211 in a new location. Thus, the second piece 211 is firmly interengaged with the first piece 206, even though the first piece is massive and of indeterminate shape, and even though the recess 207 does not necessarily extend entirely through the first piece 206.

*Fourteenth Form*

By an appropriate choice of steps and parts, an assembly can readily be made, utilizing a combination of some of the previously described techniques. A first piece 216 can be provided with a prepared recess 217 therein. The recess 217 can be of sufficient extent to pass entirely through the first piece 216, or can terminate at any convenient depth. The walls of the recess 217 are preferably substantially cylindrical as heretofore. A second piece 218 is superposed on the first piece 216 overlying the recess 217. The pieces are aligned with a punch 219 having a projection 221 depending therefrom. The projection 221 has a relatively sharp point 222 and enlarges in a smoothly curved surface into a central portion 223 of moderate or no expansion and then in a more rapidlly flaring portion 224 merges with the body of the punch 219.

The punch 219 first engages and perforates the second piece 218 and deforms and deflects the material thereof. The material travels and flows and is displaced into the recess 217, so that there is a depending portion 226 of the second piece 218 lying within the recess 217. The portion 226 or collar is expanded by the punch 219 into close, firm, intimate interengagement with the material of the first piece 216. The lower edge 227 of the displaced portion 226 of the second piece 218 may be relatively even or somewhat irregular, as illustrated. In any case, the displaced material 226 is still associated with the second piece 218 and forms a slug in close connection with the subposed first piece 216 so that a firm assembly is provided.

*Fifteenth Form*

By a further modification of the invention, a number of pieces can be joined together with a slug which is not detached at all from the uppermost piece, but is displaced therefrom to provide the desired interengagement. As shown in FIGURE 30, there is provided a first piece 231 having a recess 232. While this is illustrated as extending entirely through the first piece 231, it is only necessary that the recess 232 extend for a sufficient distance into the first piece to provide a cylindrical wall section. Superposed on the first piece 231 is any convenient number of supplemental pieces such as 233, 234, 235, 236 and 237. These can be of various materials, thicknesses and configurations. Superposed on the supplemental pieces is a superior piece 238, preferably of material which is quite readily deformable. The superior piece 238 is initially continuous and uninterrupted. The supplemental pieces 233 to 237, inclusive, all are provided with apertures substantially aligned with the recess 232.

A punch 239 is disposed in appropriate relationship with the subposed pieces and descends toward a subjacent die block, not shown, but effective to support the first piece 231 and those overlying it. The descending punch 239 encounters the superior piece 238 and displaces and draws down the material of the superior piece to enter into the apertures through the intervening pieces. Finally the drawn down material enters into and engages with the cylindrical wall of the first piece 231. With appropriate characteristics of material for the superior piece 238, and by proper operation of the punch 239, the superior piece 238 is severely deformed, but is not perforated nor torn, and ultimately occupies a position in firm interengagement with all of the intervening pieces, 233 to 237, inclusive, and also in firm interengagement with the first piece 231. The lowermost portion of the superior piece 238 preferably has a bottom surface substantially coplanar with the lowermost surface of the first piece 231 to afford a firm, neat assembly.

Conclusion

In all of the forms of the assembly, and in all of the methods of assembling, a slug is displaced from its matrix piece into firm and effective mechanical engagement with another piece. The result is an improvement in the art of joining two pieces of material together.

What is claimed is:

1. A method of fastening together pieces of material, comprising, first providing a nether piece having a recess of a predetermined shape, then covering said nether piece and said recess with a continuous upper piece, then continuously exerting pressure on said upper piece in an area immediately above said recess and sufficient to sever a slug having an upper surface and a lower surface from said upper piece and to displace said severed slug part way from said upper piece and into said recess, and finally squeezing the upper and lower surfaces of said displaced slug until said squeezed slug is enlarged peripherally into engagement with the wall of the recess and the wall of the upper piece.

2. A method of fastening together pieces of material, one of which has a recess therein, said recess having a wall, and the other of which is continuous which comprises in one continuous motion punching a slug having an upper surface and a lower surface from said other one of said pieces thus leaving shear surfaces where said slug and said other one of said pieces separate, one of said shear surfaces being on said slug and the other of said shear surfaces being on said other one of said pieces, and driving said slug along said shear surfaces part way from said other piece and into said recess, and then squeezing the upper and lower surfaces of said driven slug only to force said one shear surface on said slug into tight contact with the wall of said recess and into tight contact with said other shear surface on said other piece.

3. A method of fastening together pieces of material, only one of which has a recess with a defining wall, comprising, shearing at least a part of a slug from an other one of said pieces thus leaving shear surfaces where said slug and said other one of said pieces separate and as said shearing occurs moving the sheared part of said slug at least part way into said recess with the shear surface of said slug partially against said wall and partially against the shear surface of said other one of said pieces and then pressing opposite faces of said slug to press said shear surface of said slug into tight contact against both said wall and said shear surface of said other one of said pieces.

4. A method of fastening together pieces of material, comprising, in a first piece providing a recess having a first wall, then superposing a continuous second piece on said first piece, then shearing said second piece to leave a second wall substantially in alignment with said first wall and to provide a slug having upper and lower surfaces and at least partly detached from said second piece, then as said slug is being formed moving said slug at least partially into said recess, and then squeezing only said upper and lower surfaces of said slug in a direction to press the adjacent slug portion against said first wall and said second wall.

5. A method of fastening pieces together, comprising, providing an approximately cylindrically walled first recess in a first piece, then superposing a continuous second piece on said first piece in a position overlying said first recess, then in one motion shearing an approximately cylindrically walled slug from said second piece thereby leaving a cylindrically walled second recess in said second piece and displacing said slug at least part way into said first recess with all of said substantially cylindrically walled portions substantially congruent, and finally squeezing the opposite faces of said slug to force the cylindrical wall of said slug against the cylindrical wall of said first recess and against the cylindrical wall of said second recess.

6. A method of joining two sheets of material placed one on top of the other and only the lower of said sheets having a first aperture formed therein, which consists in at least partly shearing a slug having upper and lower surfaces from the uppermost sheet to afford a second aperture having substantially cylindrical sheared surfaces and concurrently forcing said slug to move with said sheared surfaces sliding on each other until said slug is displaced part way from said sheet and part way into the aperture of the lower sheet, and then expanding said sheared slug into firm engagement with said first and said second walls of the apertures by simultaneous pressure upon said upper and lower surfaces.

7. A method of fastening together pieces of material comprising first providing a nether piece having a recess of predetermined size and shape extending therethrough, then placing the lower surface of said nether piece on a support with an anvil substantially of said size and shape extending part way into said recess, next covering said nether piece and said recess with a continuous upper piece, and finally exerting pressure on said upper piece in an area directly above said recess and only in an area substantially of said size and shape and sufficient to sever a slug from said upper piece and to displace said severed slug part way from said upper piece and into said recess and to compress said slug against said anvil and to peripherally expand said slug into engagement with the wall of the recess and the wall of the piece from which the slug is severed.

8. A method of fastening together pieces of material comprising first providing a nether piece having a recess of predetermined size and shape extending therethrough, then placing the lower surface of said nether piece on a support underlying said recess, next covering said nether piece and said recess with a continuous upper piece, next exerting pressure on said upper piece only in an area directly above said recess and sufficient to sever a slug from said upper piece substantially of the size and shape of said recess, immediately displacing said slug at least part way into said recess, and then pressing said slug against said support with sufficient force to expand said slug peripherally into engagement with the wall of the recess and the wall of the piece from which the slug is severed.

(References on following page)

References Cited in the file of this patent

UNITED STATES PATENTS

| | | |
|---|---|---|
| 708,723 | Mathis | Sept. 9, 1902 |
| 1,190,759 | Harrington | July 11, 1916 |
| 1,252,289 | Murray | Jan. 1, 1918 |
| 1,812,151 | Jacocks | June 30, 1931 |
| 2,198,146 | Anderson | Apr. 23, 1940 |
| 2,432,819 | Schumacker | Dec. 16, 1947 |
| 2,713,197 | Schmidt | July 19, 1955 |
| 2,723,447 | Lawson | Nov. 15, 1955 |
| 2,870,533 | Benham | Jan. 27, 1959 |
| 2,975,928 | Roovers | Mar. 21, 1961 |
| 3,031,748 | Focht | May 1, 1962 |

FOREIGN PATENTS

| | | |
|---|---|---|
| 918,090 | Germany | Sept. 20, 1954 |
| 939,144 | Germany | Feb. 16, 1956 |